United States Patent [19]
Floessel

[11] 3,949,152
[45] Apr. 6, 1976

[54] TUBE ENCLOSED PRESSURE GAS INSULATED ELECTRICAL CABLE

[75] Inventor: Carl Dieter Floessel, Fislisbach, Switzerland

[73] Assignee: BBC Brown Boveri & Company Limited, Baden, Switzerland

[22] Filed: Oct. 17, 1974

[21] Appl. No.: 515,524

[30] Foreign Application Priority Data
Nov. 21, 1973 Switzerland............... 16406/73

[52] U.S. Cl............. 174/13; 174/21 CA; 174/99 E
[51] Int. Cl.².......................................... H01B 5/00
[58] Field of Search......... 174/13, 21 CA, 86, 99 E; 339/9 E

[56] References Cited
UNITED STATES PATENTS

| | | | |
|---|---|---|---|
| 2,209,152 | 7/1940 | Daniels | 174/21 C X |
| 3,377,960 | 4/1968 | Hawes | 174/99 E UX |
| 3,569,606 | 3/1971 | Clin et al. | 174/13 X |
| 3,585,271 | 6/1971 | Reynolds et al. | 174/21 CA |

*Primary Examiner*—Arthur T. Grimley
*Attorney, Agent, or Firm*—Pierce, Scheffler & Parker

[57] ABSTRACT

A tube enclosed pressure gas insulated electrical cable has at least one conductor supported within a tubular enclosure by means of insulators, the conductor being sectionalized longitudinally and provided with expansion joints between the ends of adjacent sections to compensate for thermal expansion of the conductor. To protect the expansion joint and prevent it from being compressed and possibly collapsing under the inherent weight of the internal conductor structure when the cable is laid down a steep slope, a protective device is provided, this being constituted by a compression spring interposed between the ends of adjacent sections at the expansion joint for counteracting the weight of the conductor on the joint.

3 Claims, 1 Drawing Figure

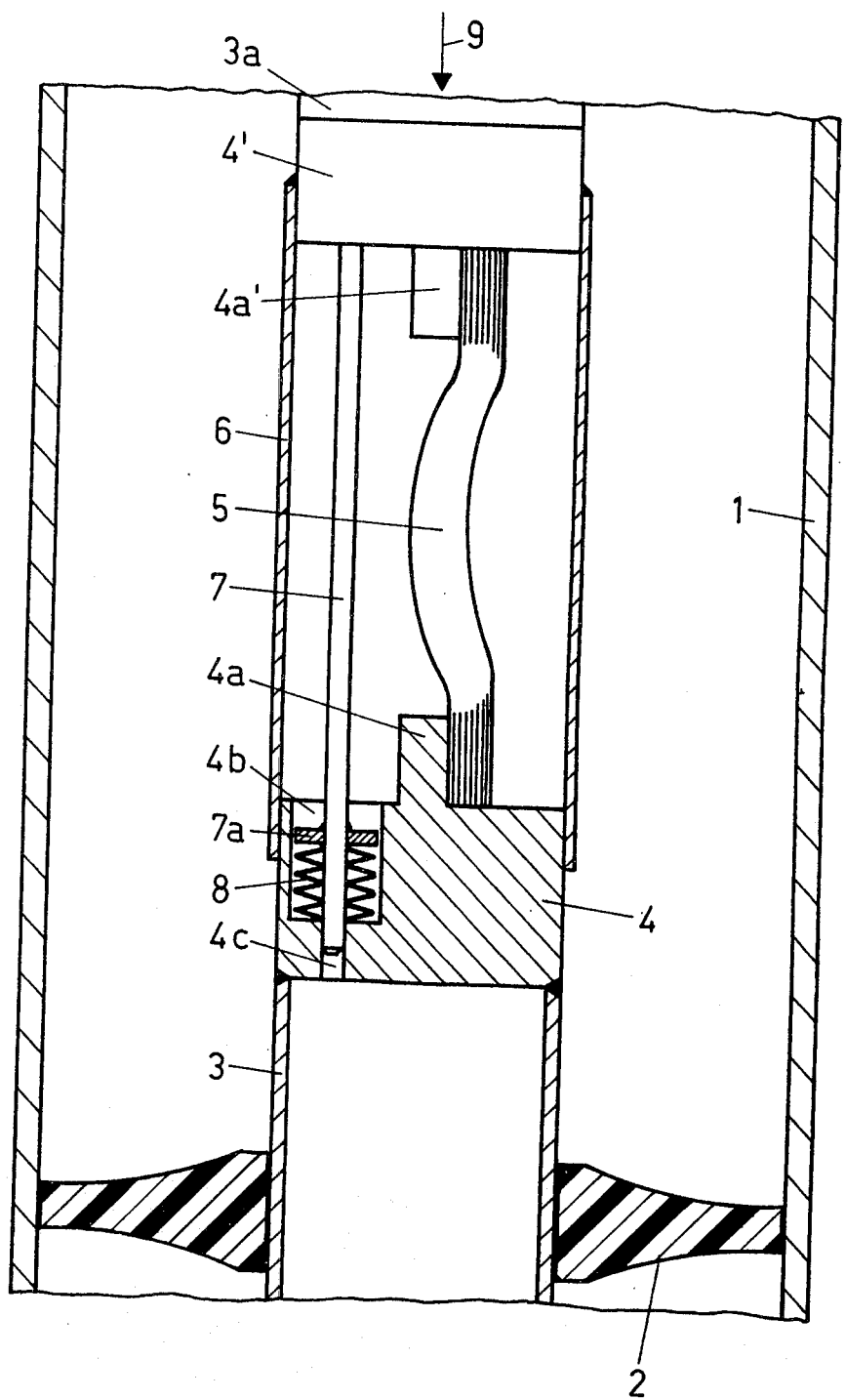

TUBE ENCLOSED PRESSURE GAS INSULATED ELECTRICAL CABLE

The invention concerns a tube enclosed pressure gas insulated electrical cable having at least one conductor supported within a tubular enclosure by means of insulators, the conductor being sectionalized longitudinally and provided with expansion joints between adjacent sections to compensate for thermal expansion of the conductor.

The tube enclosed pressure gas insulated cable is an enclosed high-voltage conductor comprising a metallic, earthable tube containing one or more conductors. The conductors are supported within the tubular enclosure by means of longitudinally spaced pin-type or disc insulators. The space between the internal conductor(s) and the tubular enclosure is filled with an insulating gas, e.g. $SF_6$ at 4 $kg/cm^2$ abs. A method of incorporating expansion devices along the length of such tube enclosed pressure gas insulated cables is known and disclosed for example in Swiss Pat. No. 535,502. In cases where these devices compensate expansion of the tubular enclosure, they are so arranged that the longitudinal movements of the connected together tubular sections relative to the expansion-joint housing can be comparatively large, but are ultimately limited by end stops. The elements for compensating thermal expansion of the internal conductor sections are in the form of flexible conductive straps.

However, if the route taken by the cable is other than horizontal, e.g. on a slope, the known configuration of expansion joints for the internal conductor is unfavourable in that with the preferred construction of tube enclosed pressure gas insulated cables the internal conductor system is made to be movable relative to the tubular enclosure, which can result in the destruction of the expansion joints of the internal conductor(s). In particular, if the slope is steep an excessive compressive force can occur at the lowermost expansion joint, for example, owing to the inherent weight of a number of lengths of internal conductor.

The objective of the invention is to avoid undesirable circumstances of this kind when a tube enclosed pressure gas insulated cable of the form described is laid on a steep slope.

This objective is achieved in that the expansion joint for the conductor incorporates a protective device of such a form that destruction of the joint is prevented in the event that compressive forces arise thereon other than those due to thermal expansion.

A preferred embodiment of the invention is illustrated in the accompanying drawing, the single view of which is a longitudinal section that shows a portion of the cable in the vicinity of an expansion joint provided between adjoining sections of the electrical conductor.

With reference to the drawing, the cable is seen to be comprised of an outer tubular member 1 which encloses an electrical conductor that is supported centrally within the tubular enclosure 1 by means of longitudinally spaced disc-shaped insulators 2, only one of which is illustrated. The electrical conductor structure is sectionalized into lengths 3, 3a which are seen to have a hollow cylindrical configuration, the conductor sections being connected together in essentially end-to-end relation with an expansion joint interposed between adjacent ends to accommodate longitudinal expansion of the overall conductor. The expansion joint comprises electrically conductive cylindrical end members 4, 4' secured respectively at one end to the ends of the hollow conductor sections 3, 3a by any suitable means e.g. welding as illustrated. Axially extending projections 4a, 4a' are provided at the opposite ends of the members 4, 4' and constitute connection points for the opposite ends of a flexible e.g. laminated conductive strap 5 which permits the ends of the conductor sections 3, 3a to move longitudinally relative to each other in response to thermally induced expansion forces.

In accordance with the invention, and for the purpose of preventing destruction of the expansion joint in the event of compressive forces thereon other than those attributable to thermal expansion, a buffer rod 7 extending longitudinally between the end members 4, 4' and located laterally of the conductive strap 5 is fixedly secured at one end to one of those members, e.g. member 4' and the other end portion of the rod extends into a bore 4c provided in the other end member 4 through which it can slide. The bore is enlarged at 4b to establish a recess for receiving and seating one end of a compression spring in the form of a stack of plate springs 8. Contacting the opposite end of the spring stack 8 within the recess 4b is a disc-shaped plate 7a secured to the rod 7. A sleeve 6, which generally defines the outer contour of the internal conductor structure such that practically no significant variations in the electrical field occur, extends between the end members 4, 4' and encloses the strap 5 and buffer rod 7, one end of this sleeve 6 being secured, such as by welding, to the end member 4' and the opposite end portion of the sleeve being telescoped over and slidable longitudinally with respect to the other end member 4 as expansions occur in the conductor structure.

If the tube enclosed cable structure is laid horizontally there is of course no danger of any damage to the expansion joint structure. If, however, the cable is laid down a steep slope in the direction of the arrow 9, the inherent weight of the internal conductor structure acting upon the expansion joint, would tend to collapse it, i.e. the flexible strap 5 has little resistance to bending. However, in such event a counter-acting and compensating force is produced by the compression of the spring stack 8 by movement of buffer rod 7 thus preventing any damage to the joint structure.

The action of the protective device, i.e. rod 7 and spring stack 8 can be easily adapted to different requirements by a suitable choice of the compression characteristic of the spring stack 8, e.g. by a suitable choice of the nature, orientation and number of spring elements. The spring stack 8 is so dimensioned that the component of gravitational force due to the inherent weight of the internal conductor structure and which arises when the cable is laid down a slope is compensated without impeding thermal expansion of the conductor structure during operation through which much greater forces are developed.

I claim:

1. A tube enclosed pressure gas insulated electrical cable comprising at least one conductor supported within a tubular enclosure by means of insulators, said conductor being sectionalized into lengths, expansion joints provided between the ends of adjacent sections of said conductor to compensate for thermal expansion of the conductor, each said expansion joint including a flexible conductor strap electrically interconnecting the ends of said adjacent conductor sections, and a protective device interposed between the ends of said adjacent sections at said expansion joint for counteracting the inherent weight of the conductor imposed on said expansion joint and limiting the compressive force applied to said flexible conductor strap when said cable is disposed in other than a horizontal attitude, said protective device comprising a buffer rod located laterally of said conductor strap, one end of said rod being secured to one of said adjacent conductor sections and the opposite end portion thereof bearing against a compression spring located in a recess provided in the other conductor section.

2. A tube enclosed pressure gas insulated electrical cable as defined in claim 1 wherein the spring receiving recess provided in the end of said conductor section is established by the larger diametered portion of a two-diametered bore, the smaller diametered portion of said bore being substantially the size of said rod and receiving the end portion thereof for guiding its movement upon compression of said spring.

3. A tube enclosed pressure gas insulated electrical cable as defined in claim 1 wherein said compression spring is constituted by a stack of plate springs.

* * * * *